Aug. 28, 1962  G. J. BERGER  3,051,053
PHOTOGRAPHIC OBJECTIVE
Filed Oct. 5, 1959
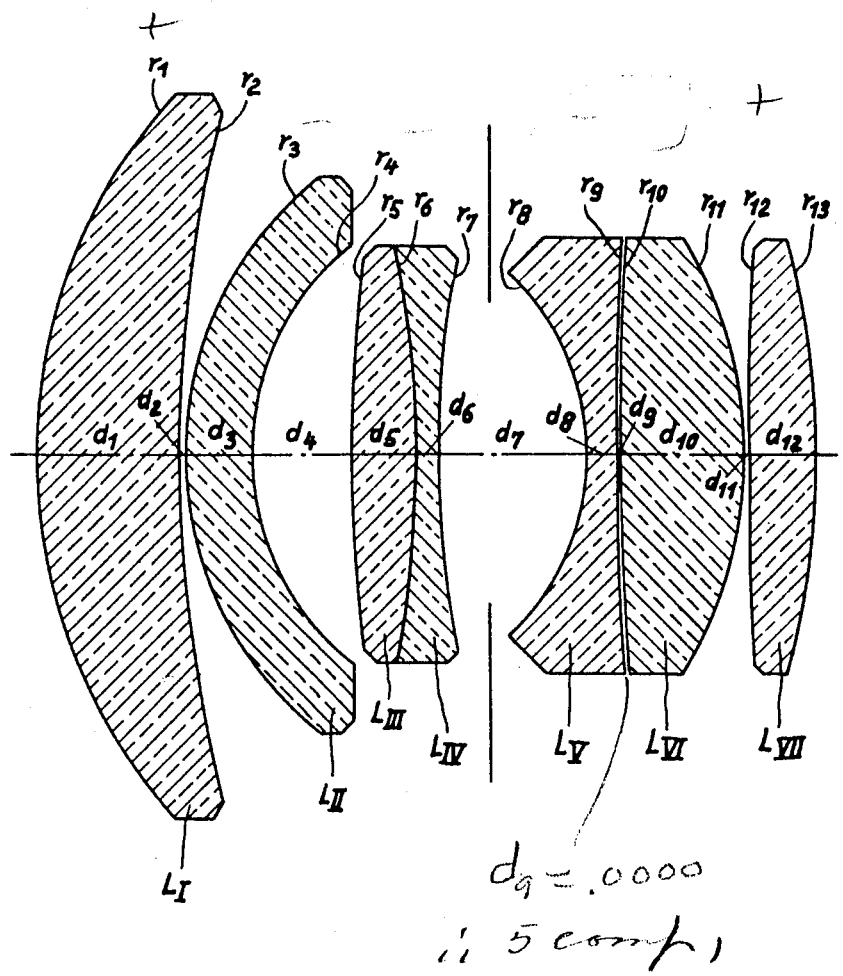

United States Patent Office 3,051,053
Patented Aug. 28, 1962

3,051,053
PHOTOGRAPHIC OBJECTIVE
Guido Johannes Berger, Heidenheim (Brenz), Wurttemberg, Germany, assignor to Carl Zeiss, Heidenheim (Brenz), Wurttemberg, Germany
Filed Oct. 5, 1959, Ser. No. 852,158
Claims priority, application Germany Oct. 10, 1958
1 Claim. (Cl. 88—57)

The present invention is based on the task of developing a photographic objective with paritcularly good flattening of the image field. An objective of the Gauss type comprising two collective outer components enclosing two dispersive meniscus-shaped components concave towards the diaphragm which is located between said two dispersive components, the absolute values of the radii of the concave surfaces of said two dispersive components lying between the limits $0.18 \cdot f$ and $0.40 \cdot f$ and the axial separation between the said two concave surfaces being greater than the arithmetical mean of the absolute values of the radii of the said two surfaces but smaller than twice the said arithmetical mean, is according to the invention varied in such a way that a third meniscus-shaped dispersive component is located between the said two first named dispersive components in front of and concave towards the diaphragm, said third dispersive component consisting of two lenses of opposite refractive power, cemented together, the cemented surface having converging power and being convex towards the diaphragm, the Abbé-$\nu$-number of the glass of said dispersive lens of said third dispersive component being smaller than that of the glass of the convergent lens cemented to it. With a view to the correction of the coma of the oblique bundles it is advisable to give the concave surface adjacent the diaphragm of said third dispersive component a radius between the limits $0.5 \cdot f$ and $2.0 \cdot f$ and to bend the two outer surfaces bordering on air of the said cemented component standing in front of the diaphragm in such a way that the difference of their radii lies within the limits $0.20 \cdot f$ and $2.50 \cdot f$, wherein $f$ is the focal length of the objective.

One embodiment of an objective according to the invention is represented as a sectioned lens in the accompanying drawing. The numerical values for the said objective of a focal length $f=1.00$ can be taken from the appended table.

Therein there are designated

By $L$, the lenses,
By $r$, the radii,
By $d$, the axial separations,
By $n_d$, the refractive indices for the $d$-line, and
By $\nu$, the Abbé numbers.

A narrow air space may be provided inside the dispersive member standing behind the diaphragm. In the embodiment the thickness of the said air space equals zero i.e. a cemented surface is here provided.

*Table*
[For a focal length of $f=1.00$]

| Lenses | Radii | Axial separations | $n_d$ | $\nu$ |
|---|---|---|---|---|
| $L_I$ | $r_1 = +0.52330$ | | | |
| | | $d_1 = 0.1377$ | 1.62041 | 60.29 |
| | $r_2 = +1.33350$ | | | |
| | | $d_2 = 0.0020$ | | |
| | $r_3 = +0.33982$ | | | |
| $L_{II}$ | | $d_3 = 0.0659$ | 1.64831 | 33.77 |
| | $r_4 = +0.25493$ | | | |
| | | $d_4 = 0.0944$ | | |
| | $r_5 = +1.58490$ | | | |
| $L_{III}$ | | $d_5 = 0.0650$ | 1.69100 | 54.80 |
| | $r_6 = -0.95775$ | | | |
| $L_{IV}$ | | $d_6 = 0.0237$ | 1.57501 | 41.31 |
| | $r_7 = +0.95775$ | | | |
| | | $d_7 = 0.1416$ | | |
| | $r_8 = -0.29216$ | | | |
| $L_V$ | | $d_8 = 0.0295$ | 1.69895 | 30.05 |
| | $r_9 = +4.80010$ | | | |
| | | $d_9 = 0.0000$ | | |
| | $r_{10} = +4.80010$ | | | |
| $L_{VI}$ | | $d_{10} = 0.1279$ | 1.71700 | 47.90 |
| | $r_{11} = -0.39811$ | | | |
| | | $d_{11} = 0.0010$ | | |
| | $r_{12} = +10.74600$ | | | |
| $L_{VII}$ | | $d_{12} = 0.0610$ | 1.74400 | 44.90 |
| | $r_{13} = -0.78298$ | | | |

Focal intercept $s' = 0.7410$

I claim:
A photographic objective of the Gauss type comprising two collective outer components enclosing two dispersive meniscus-shaped components concave toward the diaphragm which is located between said dispersive components, the absolute values of the radii of the concave surfaces of said two dispersive components lying between $0.18 \cdot f$ and $0.40 \cdot f$ and the axial separation between said concave surfaces being greater than the arithmetic mean of the absolute values of the radii of these surfaces but smaller than twice said arithmetic mean, and a further meniscus-shaped dispersive component located between said two first named dispersive components in the direction of the incoming light rays in front of and concave towards said diaphragm, said further dispersive component consisting of two lenses of opposite refractive power cemented together the cemented surface having converging power and being convex towards the diaphragm, the Abbé-$\nu$-number of the glass of the dispersive lens of said further dispersive component being smaller than that of the glass of the convergent lens cemented to it, the concave surface adjacent the diaphragm of said further dispersive component having a radius between the limits $0.5 \cdot f$ and $2.0 \cdot f$, and the difference of the radii of the two outer surfaces bordering on air of said further dispersive component lying within the limits of $0.20 \cdot f$ and $2.50 \cdot f$, $f$ being the focal longth of the objective.

References Cited in the file of this patent
FOREIGN PATENTS

| 14,673 | Great Britain | 1908 |
| 1,014,753 | Germany | Aug. 29, 1957 |